United States Patent [19]

Thiery

[11] Patent Number: 4,975,396

[45] Date of Patent: Dec. 4, 1990

[54] PROCESS FOR PRODUCING REINFORCED CEMENTITIOUS COMPOSITIONS AND THE PRODUCTS PRODUCED THEREBY

[75] Inventor: Jacques Thiery, Villers-Les-Nancy, France

[73] Assignee: Vetrotex Saint-Gobain, Chambery, France

[21] Appl. No.: 324,165

[22] Filed: Mar. 16, 1989

[30] Foreign Application Priority Data

Mar. 18, 1988 [FR] France .................. 88 03556

[51] Int. Cl.$^5$ .................. C04B 16/06; C04B 28/04; C04B 20/06; C04B 24/26
[52] U.S. Cl. .................. 501/90; 501/90
[58] Field of Search .................. 106/98, 90

[56] References Cited

U.S. PATENT DOCUMENTS

| | | | |
|---|---|---|---|
| 3,232,777 | 2/1966 | Bush | 106/90 |
| 3,852,082 | 12/1974 | Majumdar | 106/99 |
| 4,608,795 | 9/1986 | Neuschaeffer et al. | 106/84 |
| 4,689,084 | 8/1987 | Ambroise et al. | 106/98 |
| 4,793,861 | 12/1988 | Sohm | 106/99 |

FOREIGN PATENT DOCUMENTS

| | | |
|---|---|---|
| 222339 | 5/1987 | European Pat. Off. . |
| 847852 | 9/1960 | United Kingdom . |
| 1113205 | 5/1968 | United Kingdom . |
| 1588938 | 4/1981 | United Kingdom . |
| 2148871 | 6/1985 | United Kingdom . |

OTHER PUBLICATIONS

Ceramic Fibers and Fibrous Composite Materials; Refractory Materials; vol. 3, Rauch et al., (1968), 68–71.
British Standard Methods for Determining Properties of Glass Fiber Reinforced Cement Material (BS 6432:1984).

*Primary Examiner*—William R. Dixon, Jr.
*Assistant Examiner*—C. Melissa Bonner
*Attorney, Agent, or Firm*—Pennie & Edmonds

[57] ABSTRACT

A process for producing reinforced cementitious compositions in which the following constituents are mixed in the aqueous phase in the following order: about 35–55 parts by weight of water mixed with about 3–12 parts of a polymer, by weight of dry polymer; up to about 5 parts of a water-reducing auxiliary agent and/or a liquifying agent; from about 15–30 parts of metakaolin; from about 50–120 parts of silica sand; and about 100 parts of cement. Continuous mixing is maintained until a homogeneous, thixotropic paste is obtained. Then between 2 and 15% by weight of alkaline-resistant glass fibers, relative to the weight of the paste, is introduced into the paste. The product produced by this method is particularly suitable for use as a mortar or paste which may be easily sprayed upon vertical surfaces and as hydraulic concretes, resistant to the effects of weather and aging.

22 Claims, No Drawings

PROCESS FOR PRODUCING REINFORCED CEMENTITIOUS COMPOSITIONS AND THE PRODUCTS PRODUCED THEREBY

TECHNICAL FIELD

The invention relates to a process for producing reinforced, cement-based products. More particularly, it concerns the preparation of a mixture, in the aqueous phase, comprising sand, cement, metakaolin, alkaline-resistant glass fibers and a latex polymer, together with a number of optional additives, which is subsequently cured to form a stable, durable, reinforced cementitious product.

BACKGROUND OF THE INVENTION

U.S. Pat. No. 4,793,861 discloses products that have a cement base containing alkaline-resistant glass fibers, metakaolin and acrylic or styrene-butadiene latex polymers. Such products exhibit excellent resistance to aging. The purpose of the polymer component is to promote curing of the product and to further improve the moduli of rupture, i.e., the breaking stress, which may be attained with such products relative to products not including such a polymer. In certain cases, however, it is difficult to apply a mixture of the type described above, e.g., when spraying on a vertical wall, but applicant has now developed a novel process for producing mixtures which permit such modes of application.

SUMMARY OF THE INVENTION

The present invention thus provides a process for producing a product, in the aqueous phase, which avoids the drawbacks described above in the prior art. It is thus an object of the presently described process to make possible faster, less expensive, more regular production of composite material pieces, i e., those having a base of cement reinforced with glass fibers.

Compositions produced according to the presently disclosed process therefore possess a number of significant advantages over those produced by prior art processes. These advantages include, for example enhanced stability, which makes it possible to layer the composition upon a substrate with each layer having a constant thickness;

a reduction of about 15% in the time required for spray application of the proposed product, in contrast to similar products produced by prior art processes;

a reduction of from about 20–40% in the amount of mortar and glass fibers lost when the composition produced by applicant's proposed process is applied by spraying; and a decrease in the weight of the composition producted by the present process of up to 10% over similar prior art compositions not produced by the process proposed herein due to the formation, upon curing, of a microporous structure caused due to foaming produced in the aqueous mixture by the mechanical action of the mixer.

DETAILED DESCRIPTION OF THE PREFERRED EMBODIMENTS

The objects of the invention are achieved with a process which comprises mixing, in the aqueous phase, cement, at least one metakaolin exhibiting a reactivity to a modified Chapelle test greater than 500 milligrams of CaO per gram of metakaolin, at least one polymer, sand and alkali-resistant glass fibers. A number of optional additives may be included within the mix, most notably at least one water reducing and/or one liquefying agent, at least one auxiliary agent promoting the thixotropic character of the mixture and at least one setting accelerator.

The process thus comprises:

(a) mixing the water, the polymer and optionally at least one water reducing agent and/or a setting accelerator to form a first mixture;

(b) adding the metakaolin and optionally an auxiliary agent, such as microsilica or silica fume, for promoting the thixotropic character of the mixture while continuing the mixing to form a second mixture;

(c) adding the sand, cement and optionally a liquefying agent to the second mixture, then mixing the whole until a homogeneous mortar, in the form of a thixotropic paste, is obtained; and (d) incorporating a plurality of alkaline-resistant glass fibers into the paste.

The mixture prepared according to this process comprises, per about each 100 parts by weight of cement, about 35 to 55 parts of water, about 3 to 12 parts by dry weight of polymer, about 15 to 30 parts of metakaolin, about 50 to 120 parts of silica sand, optionally up to 5 parts of a water reducing and/or a liquefying agent and 2 to 15 parts by weight of glass fibers, the amount of glass fibers being relative to the total weight of the paste.

The mortar obtained before mixing with the glass fibers is, before setting, in the form of a thixotropic paste, i.e., having the appearance of a gel at rest and rapidly becoming liquefied under the effect of stirring. With such a mortar it is possible to simultaneously spray both the mortar and the glass fibers on vertical walls on the order of one meter high without the mixture sliding down the wall and thus causing an excess of material in the lower part of the wall with corresponding thin, fragile areas in the upper part of the wall. The enhanced stability of the mixture prepared according to the process of the invention makes it possible to achieve constant thicknesses i.e., on the support or in a mold. Moreover, several overlapping layers can be sprayed without it being necessary to wait for the start of stiffening or setting of the previous layer. This advantage makes it possible to reduce the spraying time by about 15% over the time required for applying prior art compositions by spray application techniques.

The thixotropic character of the mixture promotes and accelerates its impregnation by the fibers when these fibers are added to the cement matrix by rolling, thus shortening the rolling time by about 20%. Moreover, in comparison with the standard mixtures used with prior art spraying techniques, the process of the present invention makes it possible to achieve a considerable saving in materials. That is, the amount of mortar and glass fibers lost may be reduced by at least 20% and this savings may in some cases reach 40%.

The order in which the various components are incorporated is an important characteristic of the present invention and makes it possible to obtain a mixture having the advantages described herein. Thus, the presence of the polymer in the composition of first mixture (a) causes and promotes "foaming" due to the mechanical action of the mixer. This phenomenon leads to the formation in the final product of a microporous structure and therefore applicant's product has a density lower than that of the products available in the prior art.

For a given volume and relative to a standard mixture, this decrease in weight may reach 10%. The addition of the polymer also makes it possible to reduce the absorption of water by the final product.

The incorporation of metakaolin into the first mixture at step (b) to form a second mixture increases the thixotropic effect of this constituent. Further, the association of the polymer with the metakaolin at this stage of the process facilitates the formation of the thixotropic paste.

In a preferred embodiment, the polymer(s) chosen for use in the invention may be selected from among the following: styrene acrylate, styrene butadiene, polyvinyl acetate, polychloroprene, acrylic, acrylonitrile, vinyl acrylic and epoxy polymers.

In an advantageous embodiment, the glass fibers are incorporated into the paste by simultaneously spraying the glass fibers and the paste in proportions of between about 4-7% by weight of glass fibers relative to the weight of the paste. In this embodiment, it is preferable to use sand having a grain size of less than about 2 mm and preferably less than 1 millimeter, and glass fibers with a length of between about 20 and 40 mm.

The production process according to the invention is particularly advantageous when it is applied to the production of a composite product by simultaneously spraying the mortar or paste and the fibers which comprise the mixture on to a mold or a support; but it also makes it possible advantageously to produce composite products by the so-called "premix" or "contact" processes.

The "premix" or "premixing" process involves dispersing fibers, e.g., in the form of cut yarns, in the mortar by mixing prior to the molding operation. The "contact", or stratification process, makes it possible to form planar layers or layers having a moderate curvature by utilizing layers of fibers placed either on a mortar bed, into which they are then incorporated by a roller, float or press, or covering the fibers with such a bed, which is then sucked or forced through the fibers.

To obtain the desired fluidity for the mixture and to make possible an optimal use which will depend, among other things, on the particular application conditions, i.e., spraying, "premix" or "contact," at the beginning or end of the process of making the paste, up to 5 parts of an auxiliary agent per 100 parts of cement may be added. When the auxiliary agent is added at the beginning of the process, it is called a water reducer. Alternately, when it is added at the end of the process, it is called a liquefier. These auxiliary agents, such as sulfonates, are well known by those skilled in the art.

It may additionally be desirable to accelerate the setting time of the composition, and in that case there can advantageously be added to the mixing water up to 3 parts of a setting accelerator per 100 parts of cement.

To summarize, where it is desired to include an auxiliary agent into the composition, the components should be added in the following order:

(1) water + polymer + water reducer (optional) + setting accelerator (optional), (2) metakaolin + auxiliary agents (optional), (3) sand, cement, liquefiers (optional), (4) glass fibers.

The dry weight content of the polymer, as it is usually defined by those skilled in the art, to be incorporated in the mixture according to the invention, is on the order of 3 to 12 parts by weight of polymer per 100 parts by weight of cement, and advantageously about 6 to about 8 parts by weight of polymer.

The addition of microsilica or silica fume up to the order of 5 parts by weight per 100 parts by weight of cement, advantageously between 0.5 part and 2 parts, and most preferably 1 part, favorably accentuates the thixotropic effect obtained due to the process of making the mixture according to the invention. The fume is added at the same time as the metakaolin. Other products having a thixotropic effect (e.g., modified starch and polyethylene glycol) can also be incorporated into the mixture in similar, even lower, proportions.

Mixing of the constituents, other than the glass fibers, is advantageously performed with a high-speed mixer generating a great deal of turbulence, which is characterized by a strong dispersing stirring action inside the mixer. The rotation speed of the mixer is, preferably, equal to or greater than one thousand revolutions per minute.

A sand grain size such that the maximum grain diameter is on the order of about one millimeter (screen of 1.25, for example) is particularly advantageous for use in a mixture intended to be sprayed. In such cases, the length of the glass fibers should be less than about 50 mm, preferably, between about 20 and 40 mm. The diameter of the glass fibers used is most preferably between about 9 and 25 microns.

The amounts of glass fibers to be provided in a mixture according to the invention are, by weight relative to the paste, about 4 to 7% when the mixture is sprayed, about 2 to 5% for the "premix" method and about 4 to 15% for the "contact" method.

The sand used in the invention is known as siliceous sand or silica sand, i.e., a sand comprising more than 90% of pure silica.

Metakaolin or metakaolinite should be understood as the activated product of kaolinite, produced thermally or by any other means. The abbreviated formula of metakaolin can be written using the standard symbols used by concrete workers, $AS_2$ ($A = Al_2O_3$ and $S = SiO_2$). It is obtained, for example, by thermal processing of kaolinite at temperatures varying between 700° and 900° C. for periods of several hours.

According to the invention, the metakaolin used should exhibit a reactivity to the modified "CHAPELLE" test (see below) greater than 500 mg of CaO per gram of metakaolin.

Generally, for each cement used, the complete consumption of the lime portion thereof by the metakaolin is sought. An evaluation of the pozzolanic activity of each addition therefore makes it possible, as a function of the lime [$Ca(OH)_2$] to be fixed, to meter more precisely the amount that should be added. This determination, among others, is evaluated according to the modified CHAPELLE test, as described by R. LARGENT in the Bulletin de Liaison des Laboratoires des Ponts et Chaussées [Communication Bulletin of the Laboratories of the Civil Engineering Department], No. 93, January-February 1978, pages 63 and 64, which evaluates the amount of CaO, expressed in mg, potentially consumable by 1 g of pozzolan. For this purpose, the pozzolanic material and lime in suspension in water are contacted together for sixteen hours at a temperature close to boiling. After cooling, the lime that has not reacted is determined.

EXAMPLES

The invention will be better understood from the following examples given by way of illustration.

The cement base comprises, for example, a standard portland cement (CPA) or a cement with limestone filler (CPJ). The composition of the CPA cement is given in Table I. It is expressed by giving ranges and percentages of total weight, the sum of different percentages being less than 100%.

The glass used during the tests is an alkaline-resistant glass having greater than 12% by weight, and preferably between about 14–21%, of $ZrO^2$.

To better understand the advantages of the products obtained from the mixture according to the invention, relative to the products of the prior art, there are presented, by way of example in Table III, the test results obtained with three products whose composition is defined in Table II. Product No. 3 is obtained from the mixture made according to the process of the invention, whereas Products No. 1 and 2 are mixed in the conventional manner.

The two rates $t_1$ and $t_{28}$, which appear in Table III, represent the percentage by weight of water absorption relative to the total weight of the finished product after 28 days of curing; the numbers 1 and 28 represent the number of days of immersion in water at 20° C.

The third parameter $\Delta_{MOR}$ represents the relative lowering of the modulus of rupture of the product, considered after 28 days of curing and 7 days of immersion in water at 20° C. by the bending test as defined by standard BS 6432 of 1984.

The last column gives the value of the density of each product.

Comparisons between the three products illustrate the advantages obtainable with products formed by the process of the present invention for which the water absorption and decrease in resistance to rupture are notably reduced. Product No. 3, resulting from the mixture according to the invention, exhibits a density clearly less than that of the comparison products.

Finally, Table V synthesizes the results obtained with the mixtures of the invention whose ranges of constituents are mentioned in Table IV.

In Table V, "MOR" stands for the modulus of rupture as defined above and "LOP" designates the limit of proportionality or elasticity during a bending test (as defined by standard BS 6432 of 1984). Finally, epsilon ($\epsilon$) designates in % the deformation at rupture that the product can undergo after the periods of curing indicated in the table.

On an average, the results obtained are 10 to 20% greater than those obtained under the same conditions for the products of the prior art.

TABLE I

| CPA (%) | CaO | $SiO_2$ | $Al_2O_3$ | $Fe_2O_3$ | $SO_3$ | MgO | Alkaline |
|---|---|---|---|---|---|---|---|
| | 60–70 | 17–25 | 2–8 | 0.15–6 | 1–3 | 0.1–4 | 0.2–1.3 |

TABLE II

| Products | Components | Parts by Weight | |
|---|---|---|---|
| No. 1 | CPA | 100 | |
| | Silica Sand | 50 | |
| | Water | 32 | |
| | Liquifier or water reducer | 0.5 | |
| | Amount of glass fibers | 6% | when spraying |
| No. 2 | CPA | 100 | |
| | Silica Sand | 50 | |
| | Metakaolin | 30 | |
| | Water | 46.5 | |
| | Liquifier or water reducer | 1 | |
| | Amount of glass fibers | 6% | when spraying |
| No. 3 | CPA | 100 | |
| | Silica Sand | 70 | |
| | Metakaolin | 25 | |
| | Polymer (pure latex) by dry weight) | 6.2 | |
| | Water | 47.6 | |
| | Liquifier or water reducer | 1.8 | |
| | Amount of glass fibers | 6% | when spraying |

TABLE III

| Products | $t_1$ (%) | $t_{28}$ (%) | $\Delta_{MOR}$ (%) | $m_v$ |
|---|---|---|---|---|
| No. 1 | 1.5 | 10 | 15 | 2.2 |
| No. 2 | 2 | 12 | 18 | 2.1 |
| No. 3 | 1.2 | 6 | 10 | 1.9 |

TABLE IV

| Constituents | Parts by Weight | Parts by Weight |
|---|---|---|
| White cement (or grey) | CPA 55, R or HPR 100 | CPJ 100 |
| Silica sand (0–1 mm) | 50 to 100 | 50 to 100 |
| Metakaolin | 15 to 30 | 15 to 30 |
| Silica fume | 0 to 5 | 0 to 5 |
| Pure latex (by dry weight of polymer) | 3 to 10 | 3 to 10 |
| Water | 35 to 55 | 35 to 55 |
| Auxiliary Agents | | |
| Liquifier or water reducer | 0 to 5 | 0 to 5 |
| Setting accelerator | 0 to 3 | 0 to 3 |
| Glass Fibers | 4 to 6% by weight relative to the wet mortar for spraying and 2 to 5% for premix | |

TABLE V

| Curing Period | at 24 hours | at 7 days | at 28 days | at term |
|---|---|---|---|---|
| MOR (modulus of rupture) | ≧20 MPa | ≧25 MPa | ≧30 MPa | ≧28 MPa |
| LOP (limit of proportionality) | ≧8 MPa | ≧10 MPa | ≧12 MPa | ≧12 MPa |
| ($\epsilon$) Deformation at rupture | ≧1% | ≧1% | ≧1% | ≧0.7% |

I claim:

1. A process for producing a reinforced cementitious composition which comprises:
   (a) mixing a polymer together with a quantity of water sufficient to maintain a subsequently added cementitious composition in an aqueous phase until said composition is cured, so as to form a first mixture;
   (b) adding to said first mixture, with continued mixing, at least one metakaolin additive which exhibits a value with a modified Chapelle test greater than 500 mg CaO per gram of said metakaolin, so as to form a second mixture;

(c) adding a sufficient amount of a silica sand and a cement to said second mixture, with continues mixing, to form a homogeneous thixotropic paste therewith; and (d) incorporating a plurality of alkaline-resistant glass fibers into said paste to reinforce said cementitious composition, to produce a reinforced cementitious composition with a microporous structure having enhanced stability, reduced weight and greater ease of application than compositions produced by processes which do not utilize the sequence of steps set forth above.

2. The process of claim 1 wherein, for about every 100 parts by weight of said cement, said water is added in an amount of between about 35-55 parts by weight; said polymer is added in an amount of between about 3-12 parts by dry weight of said polymer; said metakaolin additive is added in an amount of between about 15-30 parts by weight and said alkaline-resistant glass fibers are added in an amount of between about 2-15% by weight relative to the total weight of said thixotropic paste.

3. The process of claim 2 which further comprises incorporating into said first mixture an additive component selected from a water reducing agent, a setting accelerating agent and a mixture thereof.

4. The process of claim 3 wherein said setting accelerating agent is incorporated into said first mixture in an amount of about 3 parts per 100 parts of cement.

5. The process of claim 2 which further comprises incorporating into said second mixture an auxiliary agent for promoting a thixotropic character within said second mixture.

6. The process of claim 5 wherein said auxiliary agent is selected from microsilica or silica fume, modified starch and polyethylene glycol.

7. The process of claim 6 wherein said auxiliary agent is incorporated with said second mixture in an amount of up to about 5 parts by weight per 100 parts by weight of said cement.

8. The process of claim 7 wherein said auxiliary agent is incorporated within said second mixture in an amount of between about 0.5-2 parts by weight per 100 parts by weight of said cement.

9. The process of claim 2 which further comprises adding a liquefying agent to said homogeneous thixotropic paste together with said sand and said cement.

10. The process of claim 3 or 9 wherein said water reducing agent and said liquefying agent are added to said composition in a total amount of up to about 5 parts by weight per 100 parts of said cement.

11. The process of claim 2 wherein said polymer is selected from the group consisting of styrene acrylate, styrene butadiene, polyvinyl acetate, polychloroprene, acrylic, acrylonitrile, vinyl acrylic and epoxy polymers.

12. A process for producing a reinforced cementitious composition which comprises:

(a) mixing between about 2-12 parts of a polymer selected from the group consisting of styrene acrylate, styrene butadiene, polyvinyl acetate, polychloroprene, acrylic, acrylonitrile, vinyl acrylic and epoxy polymers, by dry weight of said polymer, together with between about 35-55 parts by weight of water and an additive component selected from a water reducing agent, a setting accelerating agent and a mixture thereof so as to form a first mixture;

(b) adding to said first mixture, with continued mixing to form a second mixture, an amount of between about 15-30 parts by weight of a metakaolin additive which exhibits a value with a modified Chapelle test greater than 500 mg CaO per gram of said metakaolin and up to about 5 parts by weight of an auxiliary agent for promoting, within said second mixture, a thixotropic character, said auxiliary agent selected from microsilica or silica fume, modified starch and polyethylene glycol;

(c) adding to said second mixture, with continued mixing, 100 parts by weight of a cement, from about 50-120 parts by weight of a silica sand and a liquefying agent to form a homogeneous, thixotropic paste; and (d) incorporating into said thixotropic paste between about 2-15% by weight of alkaline-resistant glass fibers, relative to the total weight of said paste;

wherein said water reducing agent and said liquefying agent are added to said composition in a total amount of up to about 5 parts by weight per 100 parts of said cement, to produce a reinforced cementitious composition having, in contrast to compositions produced by processes which do not use the sequence of steps set forth above, an enhanced stability, thus permitting the formation upon a substrate of layers of said composition having a constant thickness and requiring about 15% less time to apply;

wherein the composition loses from about 20-40% less mortar and glass fibers when applied to said substrate by spraying, and is reduced in weight by an amount up to 10% due to formation, upon curing, of a microporous structure during the mixing step.

13. The process of claim 12 wherein said polymer is added to said first mixture in an amount of between about 6-8 parts by dry weight of said polymer per 100 parts of said cement.

14. The process of claim 12 wherein said glass fibers are incorporated into said thixotropic paste by substantially simultaneously spraying the glass fibers and the paste in proportions of between about 4-7% by weight of said glass fibers relative to the weight of the paste.

15. The process of claim 14 wherein said silica sand has a grain size of less than about 2 mm and said glass fibers have a length of between about 20-40 mm.

16. The process of claim 15 wherein said glass fibers have a diameter of between about 9-25 microns.

17. The process of claim 12 wherein said glass fibers are incorporated into said thixotropic paste by dispersing said fibers within said paste in proportions between about 2-5% by weight of said glass fibers relative to the weight of said paste.

18. The process of claim 17 wherein said fibers are dispersed within said paste in the form of a cut yarn.

19. The process of claim 12 wherein said glass fibers are incorporated into said thixotropic paste by layering said fibers onto a bed of said paste and then subsequently pressing said fibers into said bed by means selected from a roller, a float and a press.

20. The process of claim 12 wherein said glass fibers are incorporated into said thixotropic paste by covering said fibers with a bed of said paste and then passing said bed through said fibers.

21. The product produced by the process of claim 1 wherein said product, upon curing, develops a microporous structure weighing up to 10% less than products not produced by said process.

22. The product produced by the process of claim 12 wherein said product, upon curing, develops a microporous structure weighing up to 10% less than products not produced by said process.

* * * * *